United States Patent Office 3,532,723
Patented Oct. 6, 1970

3,532,723
PROCESS FOR NEW ALIZARIN DERIVATIVES
AND THEIR PRODUCTION
Volker Hederich, Cologne-Deutz, Günter Gehrke, Cologne-Flittard, and Klaus von Oertzen, Cologne-Stammheim, Germany, assignors to Farbenfabriken Bayer Aktiengesellschaft, Leverkusen, Germany, a corporation of Germany
No Drawing. Filed July 21, 1966, Ser. No. 566,745
Claims priority, application Germany, July 30, 1965,
F 46,751
Int. Cl. C09b 1/50, 1/52
U.S. Cl. 260—373    6 Claims

ABSTRACT OF THE DISCLOSURE 1,2-dihydroxy-anthraquinone which contains in the 4-position an amino group optionally substituted by an alkyl, aryl, alkylsulphonyl or arylsulphonyl radical is produced by treating (1) a 1-amino-anthraquinone having a sulphonic acid group, halogen or optionally etherified hydroxyl group in the 2-position and an amino group optionally substituted as above in the 4-position with (2) an alkali metal hydroxide or alcoholate.

---

The present invention relates to new alizarin derivatives and to their production.

The new alizarin derivatives are 1,2-dihydroxyanthraquinones which contain in the 4-position an amino group optionally substituted by an alkyl, aryl, alkylsulphonyl or arylsulphonyl radical.

The new compounds are obtained when 1 mol of a 1-aminoanthraquinone which contains in the 4-position an amino group optionally substituted by an alkyl, aryl, alkylsulphonyl or arylsulphonyl radical and contains in the 2-position a sulphonic acid group, halogen or an optionally etherified hydroxyl group, is treated with at least 4 mols of an alkali metal hydroxide or alkali metal alcoholate at temperatures from 80 to 200° C., preferably at 100 to 150° C.

The compounds used according to the invention as starting material may contain further substituents in the hydrocarbon radicals. The alkyl radicals are preferably lower alkyl radicals with 1 to 6 carbon atoms. Instead of the free sulphonic acids, the salts thereof may also be used. It is especially advantageous to use as starting materials compounds containing a sulphonic acid group in the 2-position, which are frequently themselves industrial products or can easily be obtained by an aqueous reaction from 1 - amino-4-bromo-anthraquinone-2-sulphonic acid which can be produced as an industrial product on a large scale.

The following is a list of some 1-amino-anthraquinones which may be used as starting material for the process according to the invention:

1-amino-4-(N-methylamino)-anthraquinone-2-sulphonic acid or salt;
1-amino-4-(N-ethylamino)-anthraquinone-2-sulphonic acid or salt;
1-amino-4-(N-butylamino)-anthraquinone-2-sulphonic acid or salt;
1-amino-4-cyclohexylamino-anthraquinone-2-sulphonic acid or salt;
1-amino-4-anilino-anthraquinone-2-sulphonic acid or salt;
1-amino-4-(hydroxy-anilino)-anthraquinone-2-sulphonic acid or salt;
1-amino-4-(chloroanilino)-anthraquinone-2-sulphonic acid or salt;
1-amino-4-toluidino-anthraquinone-2-sulphonic acid or salt;
1-amino-4-anisidino-anthraquinone-2-sulphonic acid or salt;
1-amino-4-(p-diethylamino-ethoxyanilino)-anthraquinone-2-sulphonic acid or salt;
1-amino-4-(o,o'-dimethyl-anilino)-anthraquinone-2-sulphonic acid or salt;
1-amino-4-(o,o'-diethyl-p-methyl-anilino)-anthraquinone-2-sulphonic acid or salt;
1,4-diamino-anthraquinone-2-sulphonic acid or salt;
1-amino-4-methane-sulphonamido-anthraquinone-2-sulphonic acid or salt;
1-amino-4-ethane-sulphonamido-anthraquinone-2-sulphonic acid or salt;
1-amino-4-propane-sulphonamido-anthraquinone-2-sulphonic acid or salt;
1-amino-4-butane-sulphonamido-anthraquinone-2-sulphonic acid or salt;
1-amino-4-benzene-sulphonamido-anthraquinone-2-sulphonic acid or salt;
1-amino-4-toluene-sulphonamido-anthraquinone-2-sulphonic acid or salt;
1-amino-4-(chlorobenzene-sulphonamido)-anthraquinone-2-sulphonic acid or salt;

and corresponding compounds which carry bromine or chlorine, a hydroxy, methoxy, ethoxy, propoxy, butoxy or phenoxy radical, instead of the 2-sulphonic acid group.

It is advantageous to carry out the process according to the invention which solutions of the alkali metal hydroxides, alkali metals or alkali metal alcoholates in alcohols. Suitable alcohols are, for example, ethanol, propanol, butanol, ethylene glycol, ethylene glycol monomethyl ether or, preferably, methanol. However, the reactions can also be carried out in water or other organic solvents, such as pyridine, methyl-pyridine, N-methylpyrrolidone, dioxan or anisole.

The reactions are preferably carried out at an elevated temperature, for example, at 80 to 200° C., preferably at 100 to 150° C., and, if desired, under pressure. At least 4 mols alkali per mol of the anthraquinone used as starting material are required for the reaction, but it is expedient to use higher concentrations of alkali, for example, 10 to 100 mol alkali. The interdependent optimum conditions of amount of alkali, temperature and reaction time can easily be determined by preliminary experiments.

The alizarin derivatives which can be obtained by the process according to the invention are intermediate products for dyestuffs. Some can also be used directly for dyeing synthetic fibres.

In the following examples which are given for the purpose of illustrating the invention the parts are parts by weight.

EXAMPLE 1

(a) 100 parts sodium 1-amino-4-anilino-anthraquinone-2-sulphonate are introduced at 100° C. into a solution of 500 parts powdered potassium hydroxide in 474 parts methanol and the reaction mixture is heated at 110 to 115° C. for 1 to 1½ hours. The reaction mixture is subsequently cooled to 80 to 90° C., mixed with 2500 parts water and the resultant precipitate is filtered off with suction after cooling. When the residue is subsequently treated with 2 N hydrochloric acid, there are obtained 60 parts of pure 4-anilino-1,2-dihydroxy-anthraquinone. Another 10 parts are obtained from the alkaline filtrate by acidification with 10% hydrochloric acid. When recrystallised from glacial acetic acid, the reaction product melts at 265 to 266° C.

(b) When 10 parts sodium 1-amino-4-anilino-anthraquinone-2-sulphonate are added to a solution prepared from 50 parts potassium hydroxide and 47 parts ethyl alcohol, then 6.8 parts 4-anilino-1,2-dihydroxy-anthraquinone are obtained in analogy with Example 1(a), also when the potassium hydroxide is replaced with the same amount of sodium hydroxide.

EXAMPLE 2

(a) From 95 parts methanol and 100 parts powdered potassium hydroxide there is prepared a solution into which 15 parts sodium 1-amino-4-p-toluidino-anthraquinone-2-sulphonate are introduced at 90° C. The reaction mixture is subsequently heated at 110° C. for about 1 hour, diluted with 100 parts water and then poured into 100 parts 10% aqueous hydrochloric acid; after filtering off with suction, washing with water until neutral and drying, there are obtained 10.5 parts 4-p-toluidino-1,2-dihydroxy-anthraquinone which melts at 223 to 225° C. after recrystallisation from toluene.

(b) When 1-amino-4-p-toluidino-2-phenoxy-anthraquinone are reacted in the same manner, 4-p-toluidino-1,2-dihydroxy-anthraquinone is again obtained.

EXAMPLE 3

(a) 10 parts sodium 1-amino-4-cyclohexylamino-anthraquinone-2-sulphonate are introduced at 100° C. into a solution prepared from 47 parts methanol and 50 parts potassium hydroxide. The reaction mixture is heated at 115 to 120° C. for 45 minutes, diluted with 100 parts water while cooling, and worked up with diluted hydrochloric acid in the manner described in Example 1(a). There are obtained 7 parts 4-cyclohexylamino-1,2-dihydroxy-anthraquinone which melts at 203 to 204° C., after recyrstallisation from toluene.

(b) When 100 parts potassium hydroxide are used, instead of 50 parts, the reaction is completed after 15 minutes at 140° C.

EXAMPLE 4

(a) 75 parts potassium hydroxide are dissolved in 71 parts methanol. 15 parts 1-amino-4-p-anisidino-anthraquinone-2-sulphonic acid are subsequently introduced at 100° C. After heating at 110 to 115° C. for one hour, the starting material is converted. The melt is cooled to 90° C., diluted with 100 parts water and the reaction mixture poured into 1000 parts 10% hydrochloric acid. After working up there are obtained 8.2 parts 4-p-anisidino-1,2-dihydroxy-anthraquinone which melts at 248 to 249° C. after recrystallisation from nitrobenzene.

(b) When 1-amino-4-[p - (diethylamino-ethoxy)-anilino]-anthraquinone-2-sulphonic acid is reacted in the same manner, then there are obtained 4-[p-(diethylamino-ethoxy)-anilino] - 1,2 - dihydroxy-anthraquinone which melts at 213 to 214° C. after recrystallisation from glacial acetic acid.

EXAMPLE 5

(a) 10 parts 1 - amino-4-anilino-anthraquinone-2-sulphonic acid are introduced into a solution of 50 parts sodium hydroxide in 50 parts water. The reaction mixture is heated at 125 to 130 C. until starting material can no longer be detected, then worked up with water and dilute hydrochloric acid, 7.4 parts 4-anilino-1,2-dihydroxy-anthraquinone being thus obtained; the compound is identical with the product prepared according to Example 1.

(b) The same result is obtained when the sodium hydroxide in the preceding Example 5(a) is replaced with potassium hydroxide.

EXAMPLE 6

(a) 10 parts 1-amino-4-(2',6' - dimethyl-anilino)-anthraquinone-2-sulphonic acid are introduced into a solution of 75 parts potassium hydroxide in 71 parts methanol, which has been heated to 100° C., and the reaction mixture is stirred at 110° C. for 30 minutes. After working up as described in Example 4(a), there are obtained 8.2 parts 4-(2',6'-dimethyl-anilino)-1,2-dihydroxy-anthraquinone which melts at 253 to 254° C. after recrystallisation from glacial acetic acid.

(b) When 1-amino-4(2',6'-diethyl-4'-methyl-anilino)-anthraquinone-2-sulphonic acid is reacted in the same manner, there are obtained 7.5 parts 4-(2',6'-diethyl-4'-methyl-anilino)-1,2-dihydroxy-anthraquinone which melts at 209 to 211° C. after recrystallisation from glacial acetic acid.

EXAMPLE 7

When 10 parts 1-amino-4-anilino-2-methoxy-anthraquinone are introduced at 80° C. into a solution of 50 parts potassium hydroxide in 60 parts methanol and the reaction mixture is subsequently heated at 100° C. for 5 hours while stirring, then there are obtained, after working up with water and dilute hydrochloric acid, 9 parts 4-anilino-1,2-dihydroxy-anthraquinone which is identical with the product prepared according to Example 1.

EXAMPLE 8

5 parts of the sodium salt of 1,4-diamino-anthraquinone-2-sulphonic acid are introduced into a solution of 50 parts potassium hydroxide in 47 parts methanol and the reaction mixture is heated at 110 to 115° C. for 30 minutes. After working up with water and dilute hydrochloric acid, there are obtained 3.4 parts 4-amino-1,2-dihydroxy-anthraquinone which can be recrystallised from alcohol.

EXAMPLE 9

100 parts potassium hydroxide are dissolved in 95 parts methanol, and 10 parts sodium 1-amino-4-(m-chloroanilino)-anthraquinone-2-sulphonate are then introduced into the solution at 100° C. The reaction mixture is heated at 110 to 115° C. for 2 hours and worked up in the manner described in Example 1(a). There are obtained 6.5 parts 4-(m-chloroanilino)-1,2-dihydroxyanthraquinone which melts at 274 to 275° C. after recrystallisation from pyridine.

(b) In the same manner there are obtained 6.8 parts 4-(p-hydroxy-anilino)-1 2-dihydroxy-anthraquinone from 1-amino-4- (p-hydroxy-anilino) -anthraquinone-2-sulphonic acid.

EXAMPLE 10

(a) 50 parts potassium hydroxide are dissolved in 47 part methanol at 90° C. After introducing 10 parts 1-amino-4-p-tosylamino-anthraquinone-2-sulphonic acid at 100° C., the reaction mixture is heated at 110 to 115° C. for 4 hours and worked up as described in Example 1(a); after drying there are obtained 7 parts 4-p-tosylamino-1,2-dihydroxy-anthraquinone which melts at 265 to 266° C. when recrystallised from butanol.

(b) When 1 - amino-4-p-tosylamino-2-hydroxy-anthraquinone is used, instead of 1-amino-4-p-tosylamino-anthraquinone-2-sulphonic acid, then 4-p-tosylamino - 1,2-dihydroxyanthraquinone is again obtained.

(c) In the same manner 10 parts sodium 1-amino-4-mesylamino-anthraquinone-2-sulphonate yield 7 parts 4-mesylamino-1,2-dihydroxy-anthraquinone which melts at 263 to 264° C. after recrystallisation from glacial acetic acid.

EXAMPLE 11

(a) 5 parts sodium 1-amino-4-(4'-methyl-2',6'-diethyl-anilino)-anthraquinone-2,3'-disulphonate are heated under reflux in a mixture of 50 parts water and 17 parts of a 45% aqueous potassium hydroxide solution until starting material can no longer be detected. After cooling, the mixture is acidified with 10% hydrochloric acid, and the product is filtered off with suction, washed with a 5% sodium chloride solution until neutral and dried. 3.2 parts 4- (4'-methyl-2',6'-diethyl-anilino) -1,2-dihydroxy-anthraquinone-3'-sulphonic acid are obtained.

(b) When 1 - amino-4-p-toluidino-anthraquinone-2,3'-disulphonic acid is reacted in the same manner, 4-p-toluidino-1, 2-hydroxy-anthraquinone-3'-sulphonic acid is obtained.

EXAMPLE 12

(a) 50 parts potassium hydroxide are dissolved in 78 parts ethylene glycol. 10 g. 1-amino-4-anilino-anthraquinone-2-sulphonic acid are introduced at 100° C. and the reaction mixture is heated at 110 to 115° C. for 3 hours. After working up with dilute hydrochloric acid, 7.1 parts of the 4-anilino-1,2-dihydroxy-anthraquinone described in Example 1 are obtained.

(b) The same result is obtained when the ethylene glycol is replaced in Example 12(a) with ethylene glycol monomethyl ether or m-butanol.

EXAMPLE 13

(a) 20 parts sodium are dissolved in 158 parts absolute methanol. After introducing 20 parts 1-amino-4-anilino-anthraquinone-2-sulphonic acid, the reaction mixture is heated in an autoclave at 150° C. for 2 hours. After cooling, the reaction mixture is diluted with 1000 parts water, acidified with 10% hydrochloric acid and suction-filtered. After washing with water and drying, 13.5 parts of the 4-anilino-1,2-dihydroxy-anthraquinone described in Example 1 are obtained.

(b) The same result is obtained, when 4 part sodium are used, instead of 20 parts, and the reaction is carried out at 200° C. for 5 hours.

EXAMPLE 14

(a) 20 parts 1-amino-2-bromo-4-p-toluidino-anthraquinone are introduced into a solution of 12 parts potassium hydroxide in 118 parts methanol and the reaction mixture is heated in 118 parts methanol and the reaction mixture is heated in an autoclave at 100° C. for 13 hours. After the addition of a further 5 parts potassium hydroxide, heating is continued at 150° C. for 6 hours. The reaction mixture is then worked up with dilute hydrochloric acid in the manner described above. There are obtained 15.5 parts 4-p-toluidino-1,2-dihydroxy-anthraquinone which is identical with the product prepared according to Example 2(a).

(b) When 1-amino-2-chloro-4-m-toluidino-anthraquinone is used as starting material, 4-m-toluidino-1,2-dihydroxy-anthraquinone is obtained in the same manner.

EXAMPLE 15

100 parts anisole, 20 parts powdered potassium hydroxide and 10 parts 1-amino-4-anilino-anthraquinone-2-sulphonic acid are heated at 130° C. for 8 hours. After the addition of 200 parts water, the reaction mixture is neutralised and distilled with steam. The residue is filtered off with suction and washed with water. 6 parts 4-anilino-1,2-dihydroxy-anthraquinone are obtained. The same result is obtained, when pyridine, methyl-pyridine, N-methyl-pyrrolidone or dioxan are used, instead of anisole.

EXAMPLE 16

(a) When 5 parts 1-amino-4-[2′,6′-dimethyl-anilino]-anthraquinone-2,6-disulphonic acid are introduced at 100° C. into a solution of 50 parts potassium hydroxide in 47 parts methanol, the reaction mixture is subsequently stirred at 110° C. for 15 minutes and worked up with dilute hydrochloric acid, there are obtained 3.9 parts of 1,2-dihydroxy-4[2′,6′-dimethyl-anilino] - anthraquinone-6-sulphonic acid which dissolves in water with a violet colour and in concentrated sulphuric acid with a red-violet colour.

(b) When the same amount of the anthraquinone-disulphonic acid mentioned in Example 16(a) is heated in a solution of 80 parts potassium hydroxide in 47 parts methanol at 140° C. for 2½ hours and the mixture is worked up with dilute hydrochloric acid, there are obtained 3.3 parts 1,2.6 - trihydroxy-4-[2′,6′-dimethyl-anilino]-anthraquinone which melts at 318 to 320° C. after recrystallisation from glacial acetic acid.

What we claim is:

1. Process for the production of 1,2-dihydroxy-anthraquinones which contain in the 4-position an amino group optionally substituted by:
(A) lower alkyl or cyclohexyl,
(B) phenyl, optionally containing a ring substituent of lower alkyl, methoxy, hydroxy, chloro, or diethylamino, ethoxy,
(C) lower alkylsulfonyl,
(D) phenylsulfonyl optionally substituted on the ring with methyl or chloro,
which comprises treating a 1-amino-anthraquinone which contains in the 2-position sulfonic acid, chlorine, bromine, hydroxy, lower alkoxy or phenoxy and an amino group optionally containing the substituents listed above in the 4-position, with at least 4 mols of an alkali metal hydroxide or alcoholate at a temperature from 80° to 200° C.

2. The process of claim 1 wherein the temperature is from 100° to 150° C.

3. The process of claim 1 wherein the molar ratio of alkali metal compound to anthraquinone is from 10:1 to 100:1.

4. A 1,2-dihydroxy-anthraquinone of the formula:

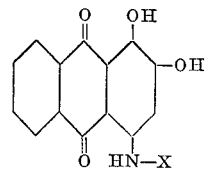

wherein X is cyclohexyl.

5. A 1,2-dihydroxy-anthraquinone of the formula

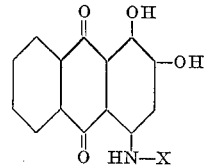

wherein X is chlorophenyl

6. A 1,2-dihydroxy-anthraquinone of the formula

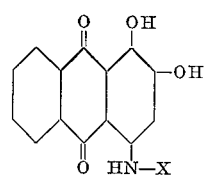

wherein X is phenylsulphonyl, tolylsulphonyl or chlorophenylsulphonyl.

References Cited

UNITED STATES PATENTS

| | | | |
|---|---|---|---|
| 1,446,163 | 2/1923 | Davies | 260—383 |
| 1,744,815 | 1/1930 | Thomas et al. | 260—383 |

FOREIGN PATENTS

| | | |
|---|---|---|
| 119,755 | 4/1904 | Germany. |

OTHER REFERENCES

Beilstein: Org. Chem., vol. 14, p. 514 (1933) (first suppl.).

LORRAINE A. WEINBERGER, Primary Examiner

E. J. SKELLY, Assistant Examiner

U.S. Cl. X.R.

260—380